United States Patent [19]

Carmien

[11] Patent Number: 5,651,631
[45] Date of Patent: Jul. 29, 1997

[54] METHOD AND APPARATUS FOR ATTACHING A TOOL HANDLE TO A TOOL HEAD

[76] Inventor: Joseph Allen Carmien, 525 N. Maple Dr., Beverly Hills, Calif. 90210

[21] Appl. No.: 676,632

[22] Filed: Jul. 10, 1996

[51] Int. Cl.$^6$ ............................................. F16B 2/14
[52] U.S. Cl. ........................ 403/261; 403/257; 403/248; 76/6
[58] Field of Search ..................... 403/261, 263, 403/257, 256, 251, 248, 247; 125/30, 40; 76/6; 81/489

[56] References Cited

U.S. PATENT DOCUMENTS

| | | |
|---|---|---|
| 47,214 | 4/1865 | Morehouse .................. 403/248 |
| 404,663 | 6/1889 | Thompson et al. . |
| 894,155 | 7/1908 | Layton . |
| 1,409,142 | 3/1922 | Gerson . |
| 1,435,851 | 11/1922 | Isham . |
| 1,489,612 | 4/1924 | Schade .................... 403/251 |
| 2,205,769 | 6/1940 | Sweetland . |
| 2,837,381 | 6/1958 | Sarlandt . |
| 2,850,331 | 9/1958 | Curry et al. . |
| 3,090,653 | 5/1963 | Stump . |
| 3,753,602 | 8/1973 | Carmien . |
| 3,819,288 | 6/1974 | Carmien . |
| 3,874,433 | 4/1975 | Shepherd, Jr. et al. . |
| 3,877,826 | 4/1975 | Shepherd, Jr. et al. . |
| 3,915,782 | 10/1975 | Davis et al. . |
| 3,917,421 | 11/1975 | Carmien et al. . |
| 4,030,847 | 6/1977 | Carmien . |
| 4,085,784 | 4/1978 | Fish . |
| 4,139,930 | 2/1979 | Cox . |
| 4,165,771 | 8/1979 | Curati, Jr. . |
| 4,287,640 | 9/1981 | Keathley . |
| 4,291,998 | 9/1981 | Santos . |
| 4,367,969 | 1/1983 | Carmien . |
| 4,404,708 | 9/1983 | Winter . |
| 4,558,726 | 12/1985 | Clay . |
| 5,031,272 | 7/1991 | Carmien . |
| 5,056,381 | 10/1991 | Carmein . |

FOREIGN PATENT DOCUMENTS

| | | |
|---|---|---|
| 151483 | 5/1953 | Australia . |
| 1064418 | 5/1954 | France . |
| 1800559 | 6/1970 | Germany . |
| 1970 | 12/1910 | United Kingdom .............. 403/251 |
| 2185209 | 7/1987 | United Kingdom . |

*Primary Examiner*—Anthony Knight
*Attorney, Agent, or Firm*—Kelly Bauersfeld Lowry & Kelley, LLP

[57] ABSTRACT

A tool handle assembly includes a molded adapter bonded to the end of a handle shaft, which adapter includes a generally cylindrical cap portion and a generally tapered frustoconical portion that surrounds the handle shaft adjacent to the cap portion. The handle assembly is inserted into a lower entrance of a tapered eyehole of a tool head such that the frustoconical portion of the adapter engages a portion of the eyehole. In one preferred form, the cap portion of the adapter includes external barbs. A pair of arcuate wedges having interior teeth are inserted between the cap portion of the adapter and the tool head and bear on the major axis of the tool head. The teeth of the wedge cooperate with the barbs of the adapter to secure the wedges in place. In another preferred form, the adapter includes a pair of slots into which wedge inserts are driven to expand the cap portion of the adapter and thus secure the tool head to the handle assembly. Again, the adapter includes barbs within the slots, and the wedges include teeth which cooperate with the barbs to secure the wedge inserts within the slots.

21 Claims, 4 Drawing Sheets

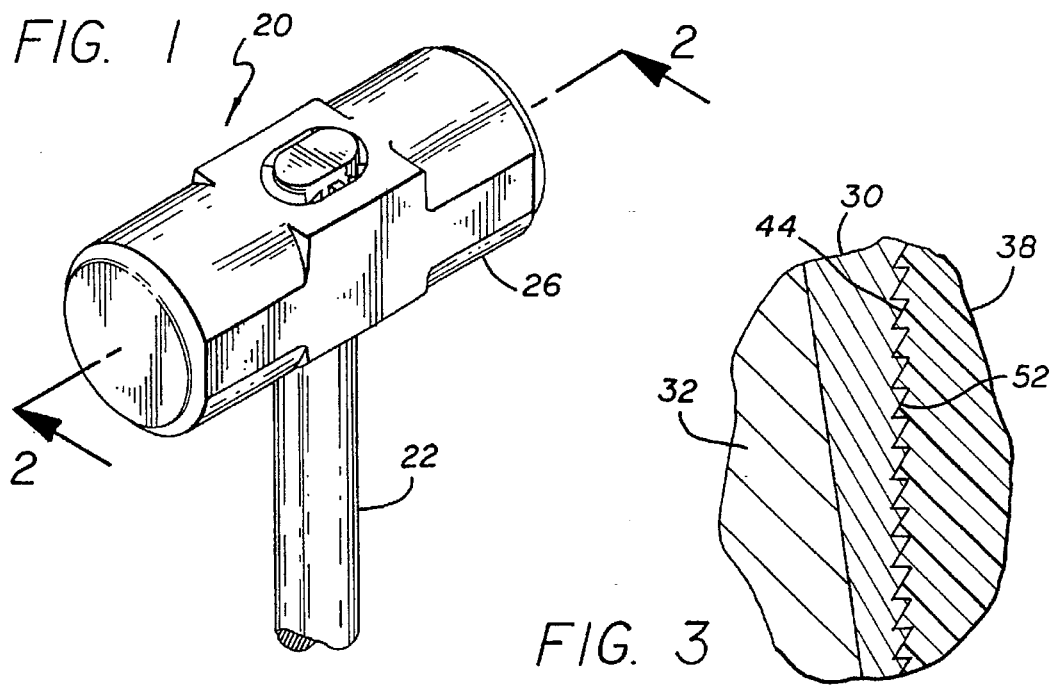
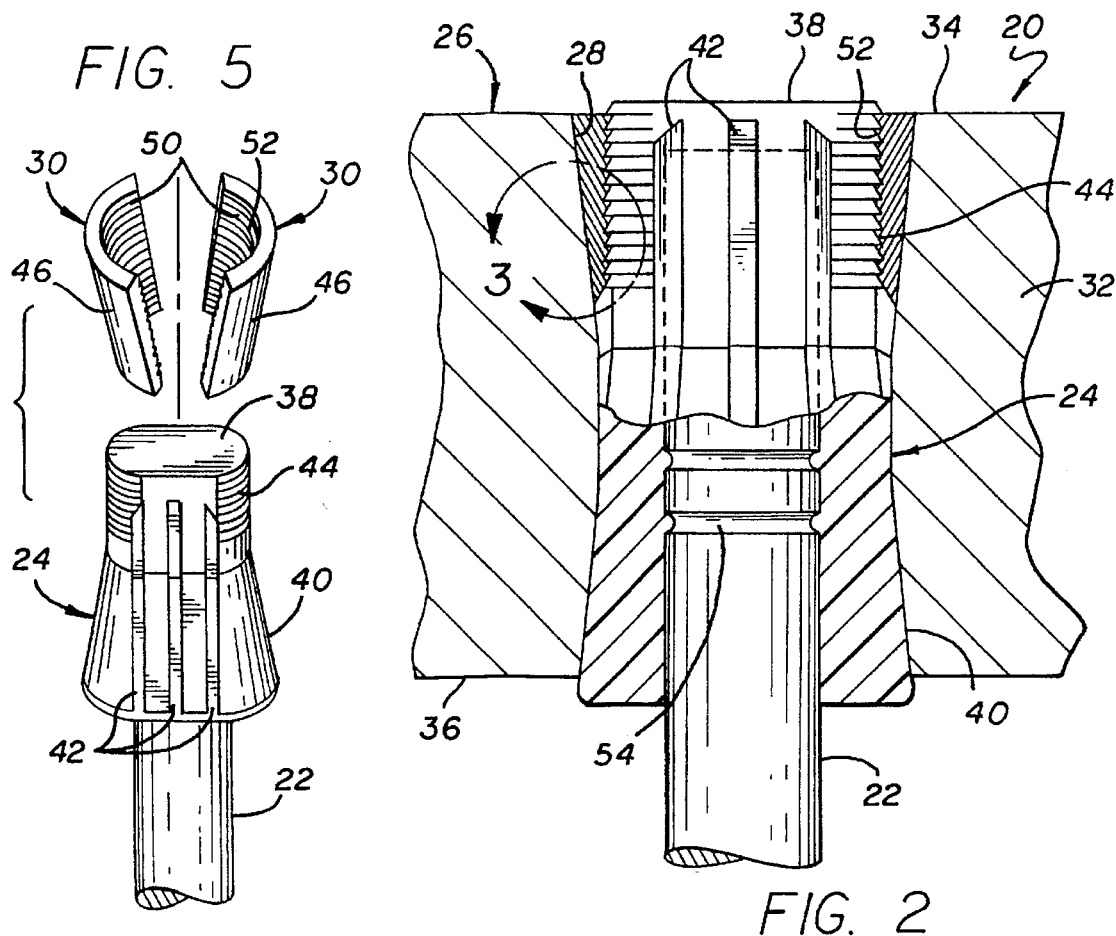

METHOD AND APPARATUS FOR ATTACHING A TOOL HANDLE TO A TOOL HEAD

BACKGROUND OF THE INVENTION

This invention relates generally to hand tools. More particularly, the present invention relates to an improved composite handle and means for attaching the handle to the heads of tools such as hammers, sledges, axes, spike mauls and the like, in such a manner that the union will be strong and invariable during the normal useful life of the tool, and which may be utilized equally well during the original manufacture of the tool or while replacing the handle in the field.

Until recent years the only material used for handles in striking, cutting and/or prying tools such as hammers, sledges, peaveys, axes, etc., has been wood. For this reason, the method of attaching the handle to the tool head, whatever type it might have been, was dictated by the property characteristics of wood. It is generally recognized that, other than being strong enough to withstand handle abuse the tool would regularly take, there are two conditions which must be accommodated when inserting a wood handle into a tool head: to keep the tool head attached to the handle under all working conditions; and to maintain the head tight to the handle.

Traditionally, in percussive tools such as sledge hammers, the tool head includes an aperture eyehole through its body which has a single or double taper. In both cases, the taper expands at the top of the tool head or that portion which is normally directed away from the user when the tool is in use. When a wooden handle is driven through the eyehole from the bottom side of the tool head, the excess wood protruding from the top side is cut off, and some wedging device, such as an ordinary wedge, is driven into the wood so that the upper end thereof is expanded to provide an inverted frustum which, theoretically, is tightly expanded into the tool eyehole. The expanded section of wood must fit within the upper tapered portion of the eyehole tightly so that the head cannot fly off during use. This is a very elemental assembly which has been in use for many years.

The use of wedges and the like to expand the upper section of the wood within the eyehole inherently involves damage to the handle which adversely affects many of the physical properties which are desired to be retained. Further, the wedges that are driven into the end of the wooden handle often tend to work loose, due most frequently to changes in humidity which cause alternate swelling and contraction of the wood with a gradual decrease in tightness. Many expedients have been employed in an attempt to overcome these faults, including the provision of metal sleeves to hold the tool handle in place, the use of adjustable wedges which must be periodically driven by the owner of the tool to compensate for loosening of the joint, the use of metal handles, the casting of wedges in position in the tool, and the provision of rubber sleeves interposed between the handle and the head. None of these aforementioned expedients have proven to be entirely satisfactory.

The primary reason why prior handles are typically inserted from the bottom and wedged at the top of the tool head is that there are very few tools which have an eyehole large enough to provide an opening through which the grip of the handle can pass. In prior handles, if the handle were small enough to pass through the eyehole, the grip would be much too small for a man to properly grasp it, and the wood would be too small to resist the abuse that the tool would take. Notably, there is one category of percussive tools that does not require the handle to be inserted from the bottom and then affixed within the eyehole as described above. This category includes the pick or pick-mattock style of tool in which the eyehole is so massive that even a large grip can be passed through the eyehole. Traditionally the handles for such pick or pick-mattock style tools are shaped so that the upper end has a reverse taper allowing the pick to be dropped over the grip onto the end farthest away from the user so that the expanded end of wood is large enough to lock the tool head in place and prevent it from ever sliding off the upper end. Of course, the tool head can always be removed in the same manner it is placed on the handle, by removing it from the butt or grip end.

As advanced materials have been introduced to replace wood, the materials have been either bonded into the eyehole of the tool, substituting the bond for the old traditional wedge, and/or welded such as metal to metal. Whereas these techniques are suitable to some degree for the manufacture of original tools in which the handle is installed with appropriate machinery and equipment at a factory, the techniques are not suitable when practiced in the field. In the case of bonding, composite shafts have been attached to tool heads primarily by means of adhesives in the epoxy field. When utilizing such adhesives, despite the continued development of these materials, it takes care, precision and good workmanship to properly install a replacement handle in a tool head reliably in the field with no secondary tools to assist. Even in factories where the tool head is installed on a production basis, high levels of quality control must be practiced in order to insure that the head is secured to the handle under all anticipated working conditions. Further, since the high strength composite shafts are usually inadequate in cross-sectional size to be comfortable for a user's hands, a grip of rubber or some other plastic material is usually molded onto the shaft or subsequently bonded thereto in a manner which guarantees that the grip will not accidentally slide off the shaft.

Accordingly, there has been a need for a highly reliable, simplified method by which a handle can be installed onto a tool head in a manner which effectively prohibits the tool head from flying off the handle unintentionally. A handle for use in such method must include a minimum number of separate parts in order to greatly simplify assembly of the handle to the tool head, and also permit attachment of a grip which comfortably fits a user's hands. Further, an improved method of attaching a handle to a percussive tool is needed which facilitates use of reinforced composite tool handles as field replacements for older tools, which overcomes drawbacks associated with fixing such handles within the eyehole of the tool head solely by means of an epoxy. Moreover, an improved tool handle and method of attaching the handle to a percussive tool is needed which simplifies the manufacture and assembly of tools for both a field user and original equipment manufacturers. The present invention fulfills these needs and provides other related advantages.

SUMMARY OF THE INVENTION

The present invention resides in a method and apparatus for attaching a tool handle to a percussive tool head in such a manner that the union will be strong and invariable during the normal useful life of the tool, and which may be utilized equally well during the original manufacture of the tool or while replacing the handle in the field. The invention further resides in the resultant hand tool which comprises, generally, a tool head having a body and an eyehole through the body, wherein the eyehole includes a taper extending toward a top of the tool head, a handle for the tool head, and means for attaching the handle to the tool head.

The means for attaching the handle to the tool head comprises an adapter bonded to an end of the tool handle that includes a generally cylindrical cap portion and a generally tapered frustoconical portion which is incapable of passing through the eyehole. The frustoconical portion surrounds the tool handle adjacent to the cap portion. The adapter is configured such that when it is inserted through the eyehole from a bottom of the tool head, the cap portion extends at least to the top of the tool head. A plurality of coinable longitudinal ridges are provided on an exterior surface of the adapter to properly align it with the eyehole when placed therein.

A pair of wedges are insertable into the eyehole from a top of the tool head. The wedges engage the cap portion of the adapter to prevent it from being withdrawn from the eyehole. In this regard, means are provided for mechanically locking the wedges to the adapter to prevent the wedges from being withdrawn from the eyehole. Such locking means include barbs formed on a surface of the adapter that cooperate with teeth provided on a surface of each wedge. The wedges are positioned opposite to one another relative to the adapter and are aligned with a major axis of the tool head.

In one preferred form of the invention, the wedges are inserted into the eyehole between the cap portion of the adapter and an interior wall of the eyehole. In this configuration the barbs are formed on an exterior surface of the cap portion of the adapter. They cooperate with teeth formed on an interior surface of the wedges to lock the wedges to the adapter.

In a second preferred form of the invention, the cap portion of the adapter includes a pair of slots into which the wedges are inserted to cause the cap portion of the adapter to expand. Each slot includes barbs therein that cooperate with teeth formed on a facing surface of the respective wedge to lock the wedge to the adapter. When utilized in a heavy duty environment, each wedge may be constructed to include a molded wedge frame and a metal toothed facing which is fixed to the frame. This second embodiment is particularly useful when the end of the handle comprises a fiber-resin jacket molded about a reinforcing core, wherein a cross-sectional area of the end of the handle is substantially less than a cross-sectional area of the eyehole.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIGS. 1–8 illustrate a first embodiment of the invention wherein:

FIG. 1 is a fragmented front, top and side perspective view of a sledge hammer embodying the invention;

FIG. 2 is an enlarged, fragmented and partially sectional view taken generally along the line 2—2 of FIG. 1, illustrating an adapter bonded to an end of a tool handle which has been inserted through a lower entrance to a double tapered eyehole of a tool head, and a pair of arcuate wedges disposed between a cap portion of the adapter and an upper tapered portion of the eyehole, bearing on the major axis of the tool head, which wedges prevent the handle assembly from being withdrawn from the tool head;

FIG. 3 is an enlarged sectional view of the area indicated by the number 3 in FIG. 2, illustrating the manner in which web teeth cooperate with adapter barbs to lock the edges to the adapter;

FIG. 4 is an exploded view of the tool head assembly shown in FIG. 2;

FIG. 5 is an exploded perspective view of the handle assembly including the adapter bonded to an end of the handle, and the pair of arcuate wedges;

FIG. 6 is a top plan view of the wedges taken generally along the line 6—6 of FIG. 4;

FIG. 7 is a side elevational view of an upper portion of the handle assembly taken generally along the line 7—7 of FIG. 4;

FIG. 8 is a sectional view taken generally along the line 8—8 of FIG. 4; and

FIGS. 9–14 illustrate a second embodiment of the invention wherein:

FIG. 9 is a fragmented front, top and side perspective view of a sledge hammer embodying the invention;

FIG. 10 is an enlarged fragmented sectional view taken generally along the line 10—10 of FIG. 9, illustrating an adapter molded over the end of a tool handle having a reduced diameter;

FIG. 11 is an exploded view of the tool head assembly shown in FIG. 10, illustrating the manner in which a pair of wedges are inserted into corresponding slots within the adapter on the major axis of the tool head, to expand the adapter in order to prevent withdrawal of the handle assembly from the tool head when assembled;

FIG. 12 is an enlarged sectional view of a molded wedge shown in FIGS. 9–11;

FIG. 13 is a side elevational view of the wedge of FIG. 12; and

FIG. 14 is a sectional view similar to FIG. 12, illustrating another type of wedge wherein a pair of metal toothed facings are adhered to a molded frame.

DETAILED DESCRIPTION OF THE PREFERRED EMBODIMENTS

Figure 4:
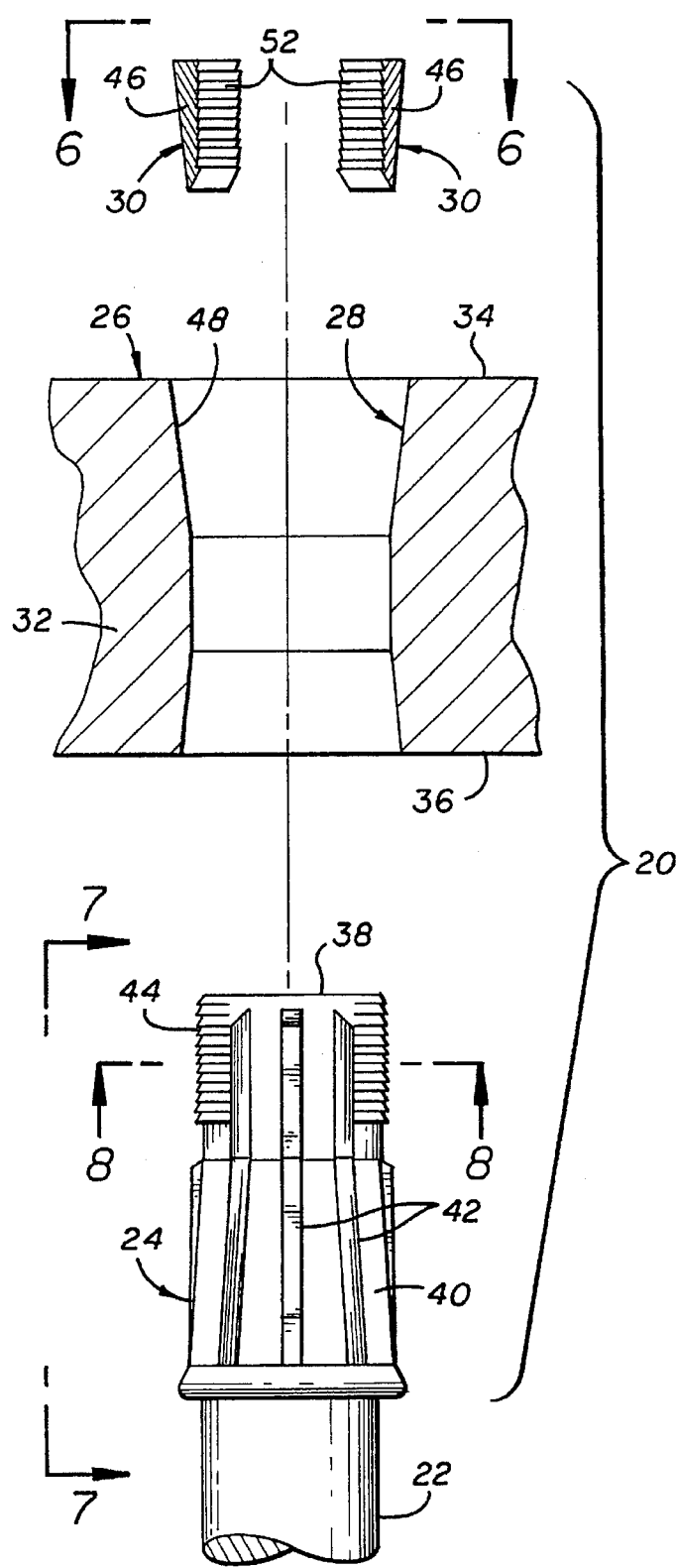
Figure 6:
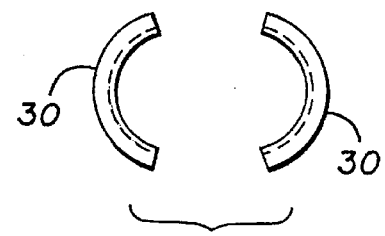
Figure 7:
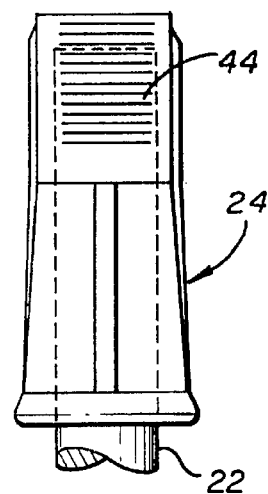
Figure 8:
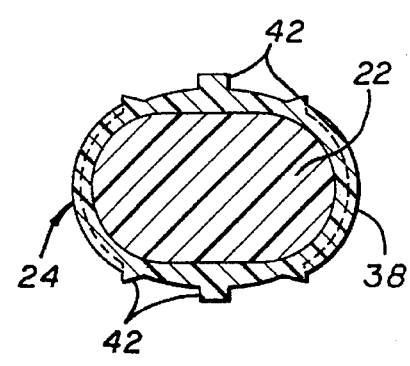
Figure 9:
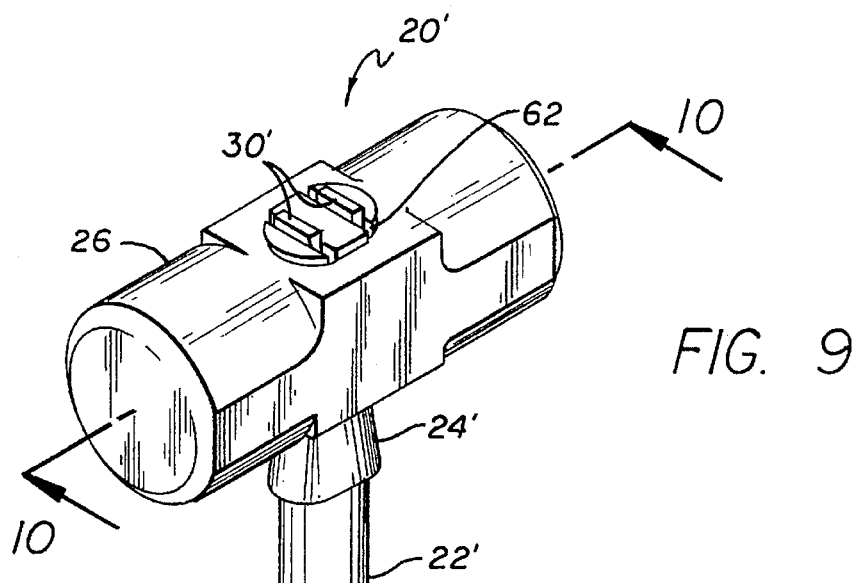

As shown in the drawings for purposes of illustration, the present invention is concerned with an improved hand tool, generally designated in the accompanying drawings by the reference numbers 20 and 20'. The hand tool 20, 20' generally comprises a tool handle 22, 22' having an adapter 24, 24' bonded to an end of the tool handle, and a tool head 26 having a tapered eyehole 28 into which the adapter 24, 24' is placed. A pair of wedges 30, 30' are insertable into the eyehole 28 from a top of the tool head 26 to engage a portion of the adapter 24, 24' in a manner which prevents the tool handle 22, 22' from being withdrawn from the tool head 26.

Tool heads 26 which may be advantageously utilized in connection with the present invention comprise most of the broad range of percussive-type tool heads. Such tool heads typically include a body portion 32 and either a single-taper or a double-tapered eyehole 28 which expands toward a top 34 of the tool head 26. The tool handle 22, 22' typically extends downwardly and away from a lower or bottom portion 36 of the tool head 26.

The drawings illustrate two embodiments of the invention. Those components of the invention relating to the second embodiment shown in FIGS. 9–14 which are the mechanical and/or functional equivalent of similar components shown in connection with the first illustrated embodiment of FIGS. 1–8 are given the same reference number and differentiated only by the prime (') symbol.

In accordance with the present invention, and as illustrated with respect to the first preferred form in FIGS. 1–8, the adapter 24 forms a cap-like member which is bonded to an end of the tool handle 26. Preferably, the adapter 24 is molded directly onto the tool handle 22 and is made of a glass-reinforced nylon material for high strength and durability. The adapter 24 includes a generally cylindrical cap portion 38 and a generally tapered frustoconical portion 40 which is incapable of passing through the eyehole 28 of the tool head 26. The frustoconical portion 40 surrounds the tool handle 22 adjacent to the cap portion 38 and is formed integrally with a cap portion. Notably, the adapter 24 is configured such that when it is inserted through the eyehole 28 from the bottom 36 of the tool head 26, the cap portion 38 extends at least to the top 34 of the tool head.

Extending longitudinally substantially the length of the adapter 24 are a plurality of coinable alignment ribs 42 which serve to properly position the adapter 24 within the eyehole 28. The coinable ribs 42 permit the adapter 24 to be utilized in connection with tool heads 26 having eyeholes 28 of slightly varying internal cross-sectional areas. The cap portion 38 of the adapter 24 further includes a plurality of barbs 44 on an exterior surface thereof. Preferably the barbs are on opposite sides of the adapter 24 and positioned so as to be in alignment with a major axis of the tool head 26.

The wedges 30 are preferably arcuate in shape and configured to have an exterior surface 46 generally matching an interior wall 48 of the eyehole 28, and an interior surface 50 generally matching the exterior surface configuration of the cap portion 38 of the adapter 24. Moreover, the interior surface 50 of the wedges 30 are provided a plurality of teeth 52 that cooperate with the barbs 44 to mechanically lock the wedges 30 to the adapter 24. Thus, when the wedges 30 are driven into a gap between a cap portion 38 of the adapter 24 and the interior wall 48 of the eyehole 28, the wedges are mechanically locked onto the adapter to prevent either the wedges 30 or the adapter 24 from being withdrawn from the eyehole 28, thus securing the tool handle 22 to the tool head 26.

Most often the adapter 24 is molded directly over the end of the tool handle 22. To facilitate secure attachment of the adapter 24 thereto, the tool handle 22 may be provided key-lock recesses 54 extending circumferentially around the tool handle 26, which serve to lock the adapter 24 in place and prevent its being pulled off of the end of the tool handle 22.

From the foregoing it will be apparent that use of the adapter 24 and the wedges 30 provides a highly efficient method for attaching the tool handle 22 to the tool head 26, wherein the method comprises the step of (1) bonding the adapter 24 to the end of the tool handle 22, (2) placing the adapter through the eyehole 26 from the bottom 36 of the tool head 26, and (3) inserting the wedges 30 into the eyehole from the top 34 of the tool head such that they engage and lock onto the cap portion 38 of the adapter 24 to prevent the adapter from being withdrawn from the eyehole. Once the assembly is complete, portions of the wedges 30 and the cap portion 38 of the adapter 24 extending beyond the top 34 of the tool head 26 may be cut-off, if desired.

Turning now to the embodiment shown in FIGS. 9–14, the adapter 24' and the wedges 30' have been modified relative to the adapter 24 and wedges 30 of FIGS. 1–8 to accommodate a tool handle 22' having a cross-sectional area at its end 56 which is substantially reduced from the cross-sectional area of the tool handle 22' through the remainder of its length. The manufacture of such tool handles 22' having configured ends 56 may be necessary when the eyehole 28 of the tool head 26 is not sufficiently large to permit wedges to be driven between the interior wall 48 of the eyehole 28 and an exterior surface 46 of the adapter 24.

Figure 10:
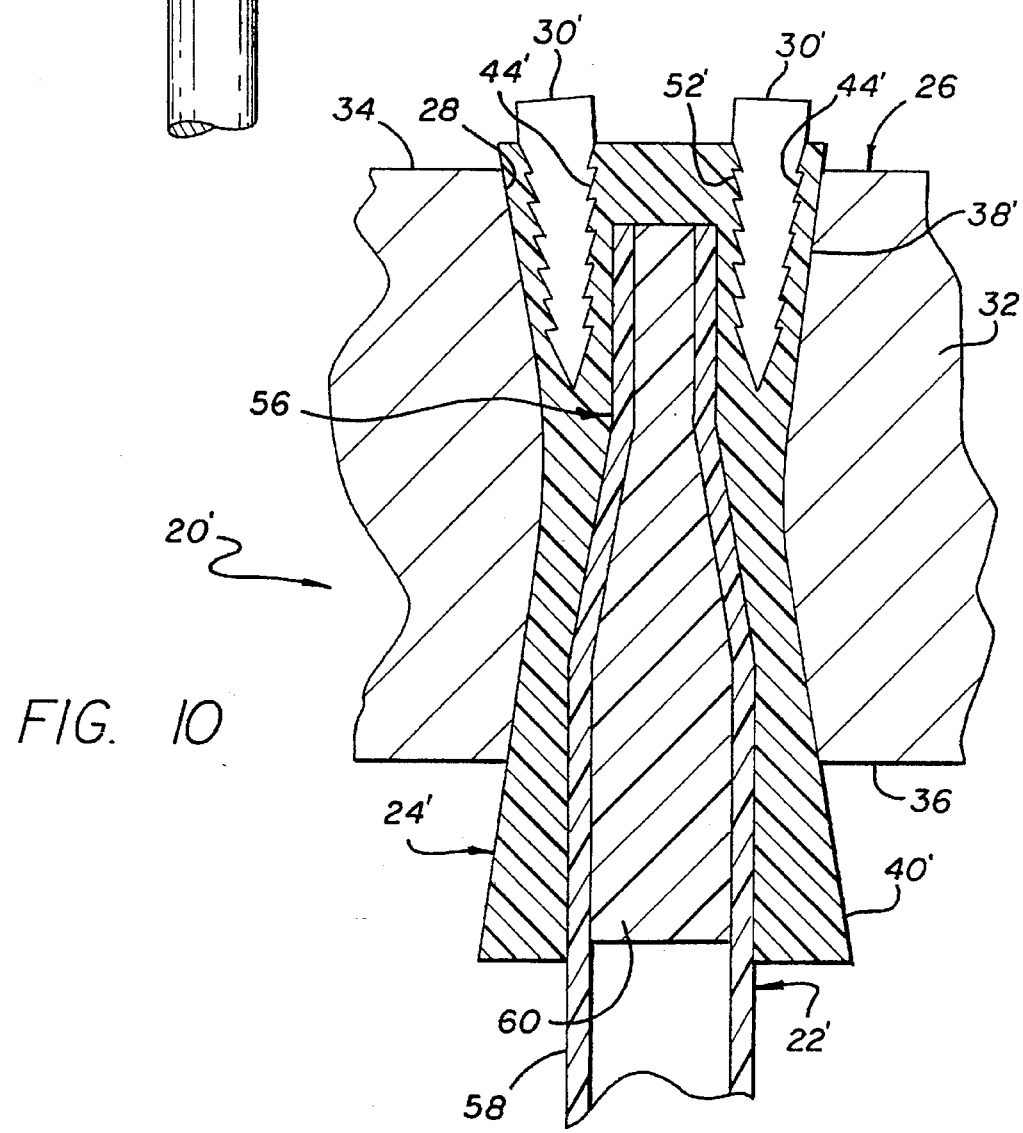
Figure 11:
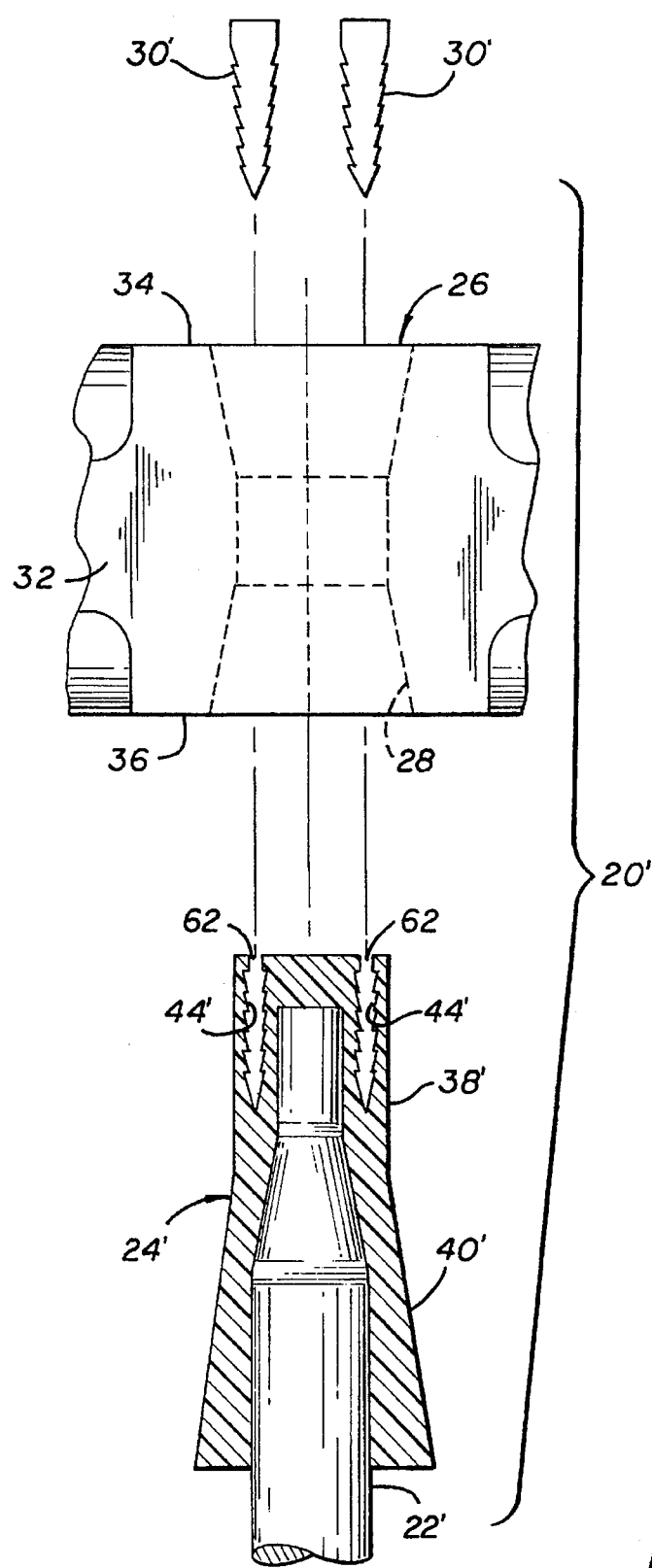
Figure 12:
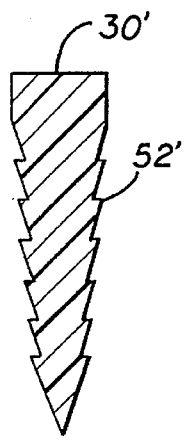
Figure 13:
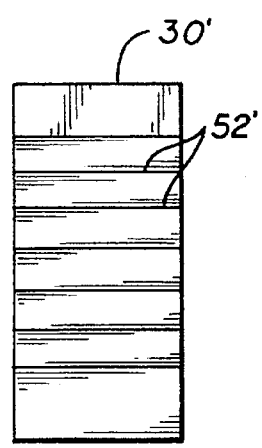

As illustrated in FIG. 10, the tool handle 22' comprises a fiber-resin jacket 58 molded about a reinforcing core 60. Again, the adapter 24' is preferably molded over the end 56 of the tool handle 22' and includes a generally cylindrical cap portion 38' and a generally tapered frustoconical portion 40' which is incapable of passing through the eyehole 28. The frustoconical portion 40' surrounds the tool handle 22' adjacent to the cap portion 38' and is molded integrally therewith. The adapter 24' is configured such that when it is inserted through the eyehole 28 from a bottom 36 of the tool head 26, the cap portion 38' extends at least to the top 34 of the tool head 26.

The cap portion 38' of the adapter 24' includes a pair of slots 62 into which the wedges 30' are inserted to cause the cap portion 38' of the adapter 24' to expand. Each of the slots 62 includes barbs 44' therein that cooperate with teeth 52' formed on facing surfaces of the respective wedges 30'. The barbs 44' and the teeth 52' cooperate to form a mechanical lock that prevents separation of the wedges 30' from the adapter 24', thereby to effectively lock the adapter 24' within the eyehole 28 of the tool head 26.

Figure 14:
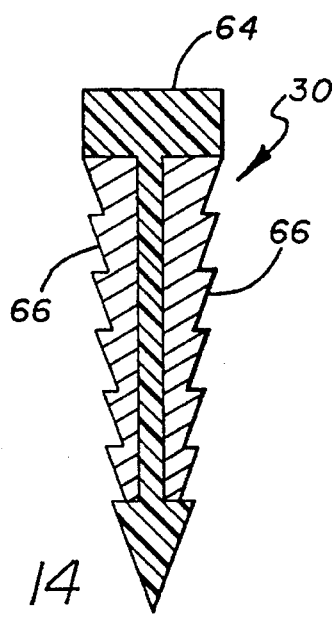

The wedges 30' may be manufactured simply of an engineering plastic or, in heavy duty situations, of a glass-filled nylon material. Alternatively, as illustrated in FIG. 14, the wedges 30' may be manufactured to include a molded wedge frame 64 and a pair of metal toothed facings 66 which are fixed to the frame 64. This latter type of wedge 30' would be useful in the heaviest of applications.

In use, after the adapter 24' has been bonded (by molding or by use of an adhesive) to the end 56 of the tool handle 22', the adapter is placed through the eyehole 28 from a bottom 36 of the tool head 26. The wedges 30' are then driven into the slots 62 so that the teeth 52' thereof engage the barbs 44' within the slots 62. Driving the wedges 30' into the slots 62 serves to cause the cap portion 38' of the adapter 24' to expand, thereby locking the adapter 24' to the tool head 26. Again, following assembly of the adapter 24' and the wedges 30', any portion of the adapter and the wedges extending beyond the top 34 of the tool head 26 may be cut off, if desired.

From the foregoing it is to be appreciated that the present invention provides a highly reliable, simplified method by which a handle can be installed onto a percussive tool head, which effectively prohibits to tool head from flying off the handle unintentionally. The hand tool 20, 20' of the present invention includes a minimum number of separate parts which greatly simplifies assembly of the handle 22, 22' to the tool head 26. The present invention further facilitates use of reinforced composite tool handles as field replacements for older tools, and the present method overcomes drawbacks associates with fixing such handles within the eyehole 28 of the tool head 26 solely by means of an epoxy.

Although two particular embodiments of the invention have been described in detail for purposes of illustration, various modifications may be made without departing from the spirit and scope of the invention. Accordingly, the invention is not to be limited, except as by the appended claims.

I claim:

1. An apparatus for attaching a tool handle to a tool head having an eyehole that includes a taper extending toward a top of the tool head, the apparatus comprising:

an adapter bonded to an end of the tool handle, including a cap portion and a lower portion incapable of passing through the eyehole, which surrounds the tool handle adjacent to the cap portion, wherein the adapter is configured such that when it is inserted through the eyehole from a bottom of the tool head the cap portion extends toward the top of the tool head;

a pair of wedges insertable into the eyehole from a top of the tool head, wherein the wedges engage the cap portion of the adapter to prevent the adapter from being withdrawn from the eyehole; and means for mechanically locking the wedges to the adapter.

2. The apparatus of claim 1, wherein the means for mechanically locking the wedges to the adapter include barbs formed on a surface of the adapter that cooperate with teeth provided on a surface of each wedge.

3. The apparatus of claim 2, wherein the wedges are inserted into the eyehole between the cap portion of the adapter and an interior wall of the eyehole so that barbs formed on an exterior surface of the cap portion of the adapter cooperate with teeth formed on an interior surface of the wedges to lock the wedges to the adapter.

4. The apparatus of claim 1, wherein the wedges are positioned opposite to one another relative to the adapter and are aligned with a major axis of the tool head.

5. The apparatus of claim 1, wherein the adapter includes a plurality of coinable longitudinal ribs on an exterior surface thereof, for aligning the adapter with the eyehole.

6. The apparatus of claim 2, wherein the cap portion of the adapter includes a pair of slots into which the wedges are inserted to cause the cap portion of the adapter to expand.

7. The apparatus of claim 6, wherein each slot includes barbs therein that cooperate with teeth formed on a facing surface of the respective wedge to lock the wedge to the adapter.

8. The apparatus of claim 7, wherein each wedge includes a molded wedge frame and a toothed facing fixed to the frame.

9. A hand tool, comprising:

a tool head having a body and an eyehole through the body, wherein the eyehole includes a taper extending toward a top of the tool head;

a handle for the tool head;

an adapter bonded to an end of the tool handle, including a generally cylindrical cap portion and a generally tapered frustoconical portion incapable of passing through the eyehole, which surrounds the tool handle adjacent to the cap portion, wherein the adapter is configured such that when it is inserted through the eyehole from a bottom of the tool head the cap portion extends at least to the top of the tool head; and a pair of wedges insertable into the eyehole from a top of the tool head, wherein the wedges engage the cap portion of the adapter to prevent the adapter from being withdrawn from the eyehole.

10. The hand tool of claim 9, wherein the adapter includes a plurality of coinable longitudinal ribs on an exterior surface thereof, for aligning the adapter with the eyehole.

11. The hand tool of claim 9, wherein the wedges are positioned opposite to one another relative to the adapter and are aligned with a major axis of the tool head.

12. The hand tool of claim 9, including barbs formed on a surface of the adapter that cooperate with teeth provided on a surface of each wedge to mechanically lock the wedges to the adapter to prevent the wedges from being withdrawn from the eyehole.

13. The hand tool of claim 12, wherein the wedges are inserted into the eyehole between the cap portion of the adapter and an interior wall of the eyehole so that barbs formed on an exterior surface of the cap portion of the adapter cooperate with teeth formed on an interior surface of the wedges to lock the wedges to the adapter.

14. The hand tool of claim 12, wherein the end of the handle comprises a fiber-resin jacket molded about a reinforcing core, and wherein a cross-sectional area of the end of the handle is substantially less than a cross-sectional area of the eyehole.

15. The hand tool of claim 14, wherein the cap portion of the adapter includes a pair of slots into which the wedges are inserted to cause the cap portion of the adapter to expand, wherein each slot includes barbs therein that cooperate with teeth formed on a facing surface of the respective wedge to lock the wedge to the adapter.

16. The hand tool of claim 15, wherein each wedge includes a molded wedge frame and a toothed facing fixed to the frame.

17. A method for attaching a tool handle to a tool head having an eyehole that includes a taper extending toward a top of the tool head, comprising the steps of:

bonding an adapter to an end of a tool handle, wherein the adapter includes a cap portion and a generally tapered lower portion incapable of passing through the eyehole, which surrounds the tool handle adjacent to the cap portion, wherein the adapter is configured such that when it is inserted through the eyehole from a bottom of the tool head, the cap portion extends at least to the top of the tool head;

placing the adapter through the eyehole from a bottom of the tool head; and inserting a wedge into the eyehole from a top of the tool head such that it engages and locks onto the cap portion of the adapter to prevent the adapter from being withdrawn from the eyehole.

18. The method of claim 17, wherein the inserting step includes the steps of inserting a pair of wedges into the eyehole from a top of the tool head such that the wedges engage the adapter and are positioned opposite to one another relative to the adapter and are aligned with a major axis of the tool head.

19. The method of claim 18, including the step of forming barbs on a surface of the adapter that cooperate with teeth provided on a surface of each wedge.

20. The method of claim 19, wherein the inserting step includes the step of inserting the wedges into the eyehole between the cap portion of the adapter and an interior wall of the eyehole such that barbs formed on an exterior surface of the cap portion of the adapter cooperate with teeth formed on an interior surface of the wedges to lock the wedges to the adapter.

21. The method of claim 19, wherein the inserting step includes the step of inserting the wedges into a pair of slots provided in the adapter to cause the cap portion of the adapter to expand.

* * * * *